United States Patent [19]
Ennis

[11] Patent Number: 5,918,900
[45] Date of Patent: Jul. 6, 1999

[54] HYBRID INFLATOR WITH BORE AND BURST DISK

[75] Inventor: Thomas A. Ennis, Troy, Mich.

[73] Assignee: Breed Automotive Technology, Inc., Lakeland, Fla.

[21] Appl. No.: 08/752,098

[22] Filed: Nov. 20, 1996

[51] Int. Cl.[6] .............................. B60R 21/26; C06D 5/06
[52] U.S. Cl. ...................... 280/736; 280/737; 280/740; 280/742; 102/289
[58] Field of Search .................................. 280/736, 737, 280/740, 742; 102/289

[56] References Cited

U.S. PATENT DOCUMENTS

| | | | |
|---|---|---|---|
| 3,960,390 | 6/1976 | Goetz | 280/737 |
| 4,620,500 | 11/1986 | Condon | 116/268 |
| 5,028,070 | 7/1991 | Bender | 280/741 |
| 5,078,078 | 1/1992 | Cuk | 116/272 |
| 5,404,746 | 4/1995 | Ocker | 73/37 |
| 5,423,570 | 6/1995 | Kort et al. | 280/736 |
| 5,533,751 | 7/1996 | Kort et al. | 280/741 X |
| 5,593,180 | 1/1997 | Cuevas et al. | 280/741 |
| 5,601,308 | 2/1997 | Cuevas | 208/741 X |
| 5,630,619 | 5/1997 | Buchanan et al. | 280/741 |
| 5,634,661 | 6/1997 | Dahl et al. | 280/741 |
| 5,651,563 | 7/1997 | Cuevas | 280/737 |
| 5,690,357 | 11/1997 | Cuevas | 280/737 |

FOREIGN PATENT DOCUMENTS

| | | |
|---|---|---|
| 0455435 | 11/1991 | European Pat. Off. . |
| 3107974 A1 | 9/1982 | Germany . |
| WO 9520509 | 8/1995 | WIPO . |

*Primary Examiner*—Peter A. Nelson
*Attorney, Agent, or Firm*—Markell Seitzman

[57] ABSTRACT

A cylindrically shaped hybrid inflator comprising: a pressure vessel filled with pressurized inflation gas, comprising a center body (22) having a first (24a) and a second (24b) end, a first exit orifice (29) located between the first and second end, a frangible disk (32) closing the orifice (29) and a pyrotechnic element for causing the disk to rupture and permit inflation gas to exit the orifice; a first cylindrical portion (50) sealingly attached to the first end and a second cylindrical portion sealing attached to the second end.

13 Claims, 3 Drawing Sheets

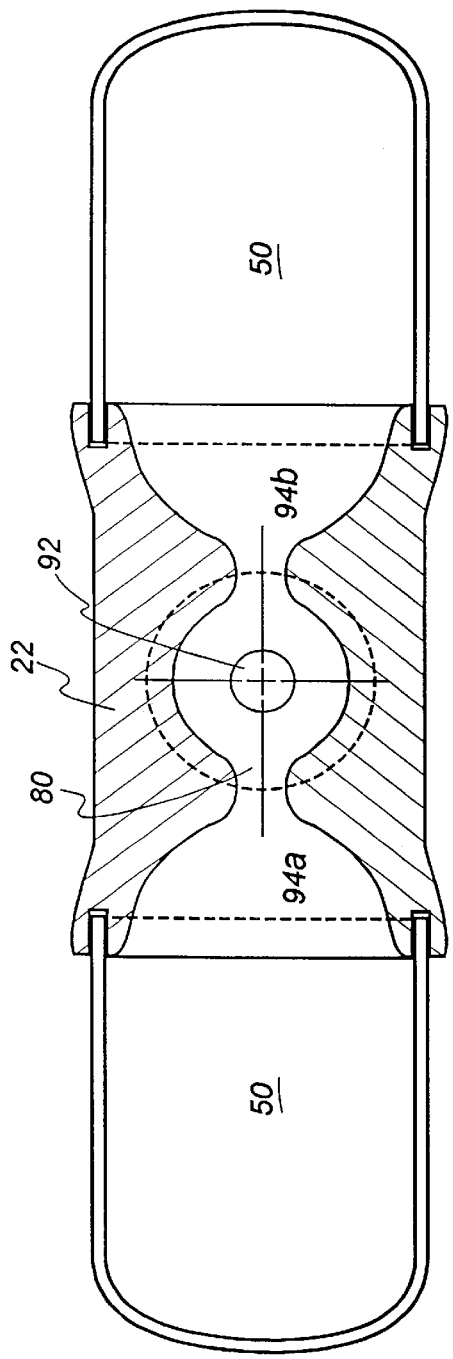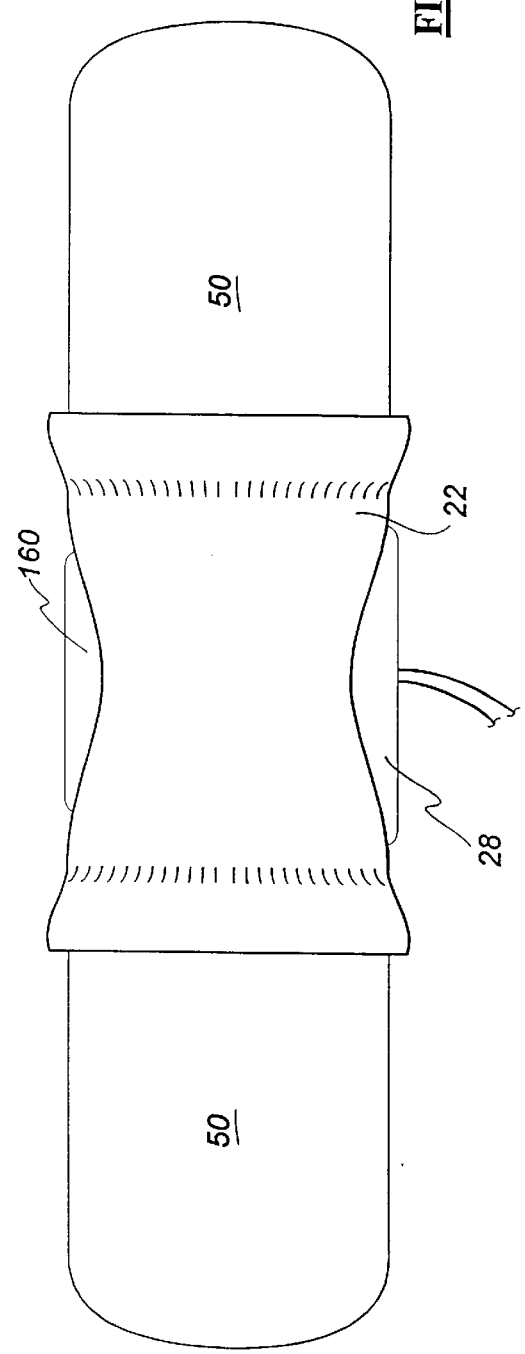

HYBRID INFLATOR WITH BORE AND BURST DISK

BACKGROUND AND SUMMARY OF THE INVENTION

The present invention generally relates to hybrid inflators.

U.S. Pat. No. 5,351,988 is illustrative of a typical cylindrically-shaped hybrid inflator. The inflator includes a pressure vessel filled with an inert gas. One end of the pressure vessel is enclosed by a frangible disk. Positioned outside of the pressure vessel portion of the hybrid inflator are one or more exit ports. These exit ports historically have been located on one side of the inflator body. Upon actuation of the inflator, the frangible disk is broken and inflation gas flows asymmetrically into an air bag. If a more uniform air flow through the inlet or neck of the air bag is desired, the hybrid inflator is typically housed within a manifold such as that illustrated in U.S. Pat. No. 5,308,108. The use of the manifold obviously increases the weight of the overall unit.

It is an object of the present invention to provide an improved hybrid inflator. A further object of the present invention is to provide a hybrid inflator having a symmetric air flow relative to the body of the inflator.

Accordingly the invention comprises a hybrid inflator comprising: a pressure vessel filled with pressurized inflation gas, comprising a center body having a passageway and a first and a second end, a first exit orifice located between the first and second end, a frangible disk closing the orifice and first means for causing the disk to rupture and permit inflation gas to exit the orifice; a first cylindrical portion sealingly attached to the first end and a second cylindrical portion sealingly attached to the second end. In the preferred embodiment of the invention the exit orifice is located midway between the ends of the first and second cylindrical portions. The passageway of the center body includes facing converging nozzles having throats positioned on either side of the exit orifice.

Many other objects and purposes of the invention will be clear from the following detailed description of the drawings.

BRIEF DESCRIPTION OF THE DRAWINGS

In the drawings:

FIG. 3 shows a cross-sectional view taken through section lines 3—3 of FIG. 1.

FIG. 4 is a side plan view of the inflator of FIG. 1.

DETAILED DESCRIPTION OF THE DRAWINGS

Figure 2:
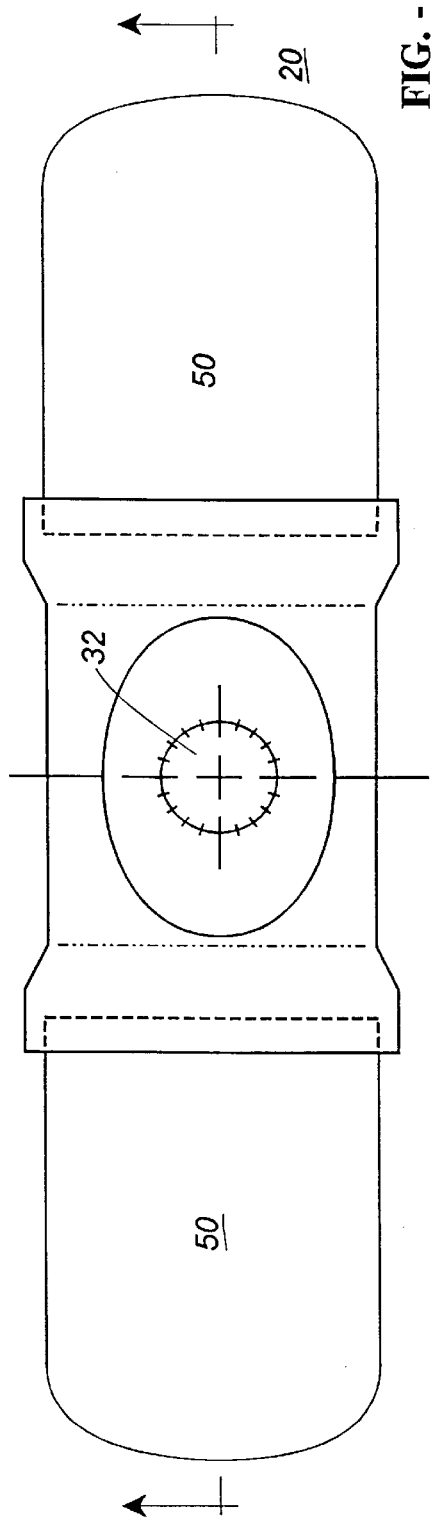
FIG. 2 illustrates a top plan view of the present invention.
Figure 1:
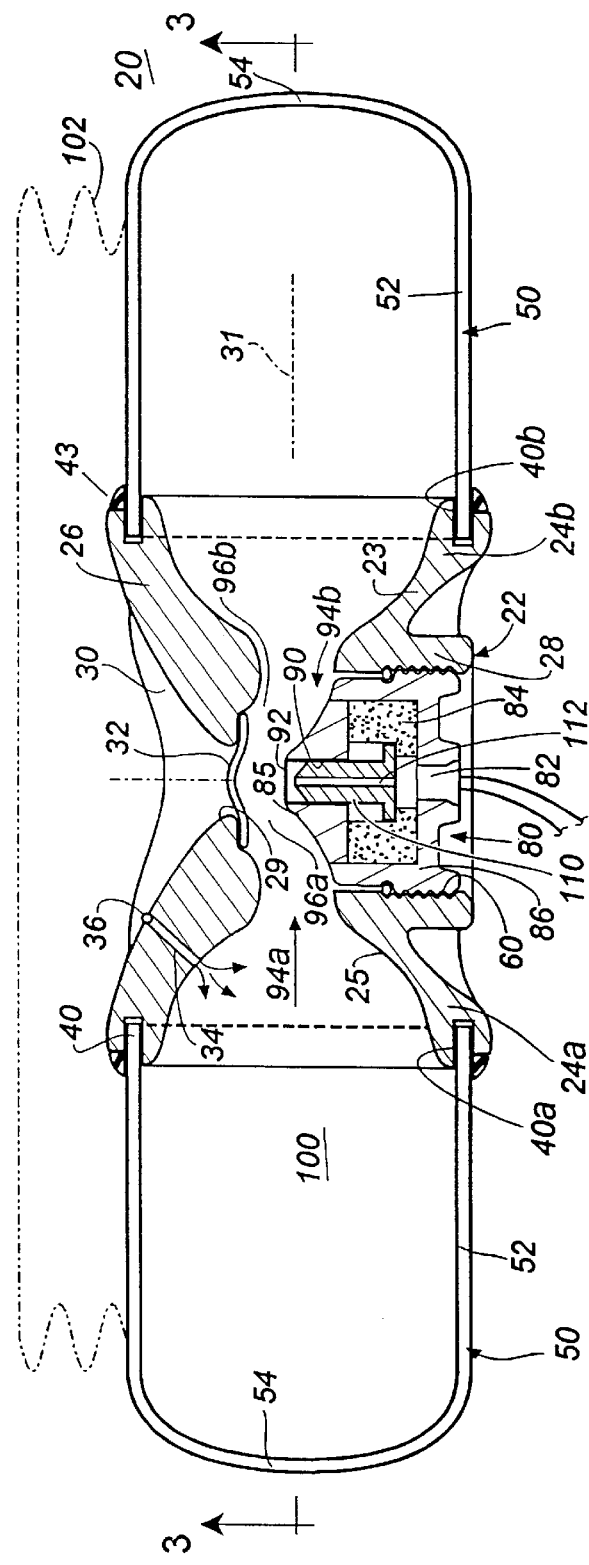
FIG. 1 illustrates a cross-sectional view of a hybrid inflator constructed in accordance with the present invention.

Reference is made to FIGS. 1 and 2 which illustrate a hybrid inflator 20 having a centrally located, hollow body 22 having an internal wall 23, defining a tapered through passageway or passage 25 and ends 24a and 24b. The body includes an upper section 26 and a lower section 28. The body 22 is preferably fabricated by, but not limited to molding or casting bronze, steel or other suitable material. The upper section 26 includes an opening or exit orifice 29 and an annular ledge 30 about the orifice. The ledge 29 supports a frangible, thin burst disk 32 that is peripherally welded thereon. The through passage 25 includes facing first and second converging nozzles 94a and 94b situated laterally on either side of the burst disk 32. Each nozzle 94a and 94b includes an upwardly curving end or throat portion 96a and 96b which channels the inflation gas flow generally upwardly, toward the orifice 29 and which encourages inflation gas to flow generally perpendicular to a longitudinal axis 31 running the length of the inflator and then directly into an air bag 102 positioned adjacent the inflator. The upper section 26 additionally includes a fill passage 34 sealed by a ball or metal plug 36 that is welded in place after the inflator is pressurized with an inert inflation gas such as Argon or equivalent. Each end 24a and 24b includes an annular slot or groove 40a and 40b respectively. Positioned on each slot or groove 40a and 40b is an edge 40 of a respective cylindrical closure member 50. Each member may be welded or brazed to the body (see numeral 43). The central body 22 and two closure members 50 define the pressure vessel 100 of the inflator 20. Each cylindrical member 50 is typically fabricated of steel and includes a wall 52 and end 54. The wall 52 and end 54 may be integrally formed as illustrated or alternatively, the end can be welded to a hollow, cylindrical sleeve. The lower section 28 of the body includes a central bore 60. Threadably received within the bore 60 is a pyrotechnic assembly generally shown as 80 comprising a squib 82 which includes a quantity of fast-burning propellant, an adjacently positioned larger quantity of slow-burning propellant 84, both of which are located within a generant housing 86. The generant housing includes a passage 90 which may be sealed by a second burst disk 92 to isolate the propellant 84 from the stored, pressurized inflation gas. As can be seen, the contoured walls 85 of the generant housing 86 form part of the nozzle throats 96a,b. A sliding piston 110 may optionally be located within passage 90. The piston 110 may include a through bore 112 through which products of combustion of the burning propellant may flow.

In operation upon receipt of an activation signal communicated to the squib 82, an intense flame is created causing the propellant 84 to burn. As the pressure builds up within the passage 90, the burst disk 92 is opened. The products of combustion produced upon the burning of the propellant 84 heat the inflation gas within the pressure vessel 100. The products of combustion (heat, flame or shock wave) also bear upon the burst disk which may cause the burst disk to rupture. If the sliding piston 110 is employed the buildup of pressure will propel the piston into the burst disk 32 opening same. Alternately, the burst disk 32 may be ruptured in response to the buildup of pressure within the pressure vessel, however, this would slightly delay the opening of the burst disk in comparison to directly using the products of combustion or using the piston. Thereafter, the heated inflation gas is communicated to an adjacently positioned air bag 102.

Figure 6:
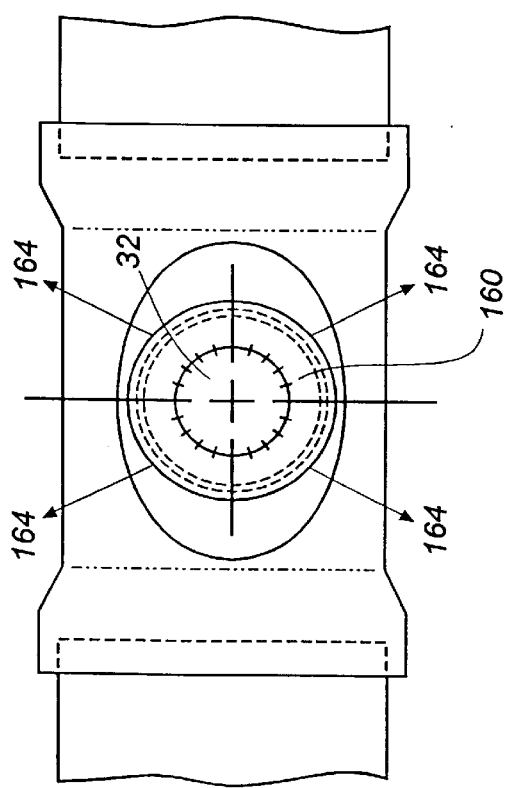
FIG. 6 is a partial top view of the inflator shown in FIG. 5.
Figure 5:
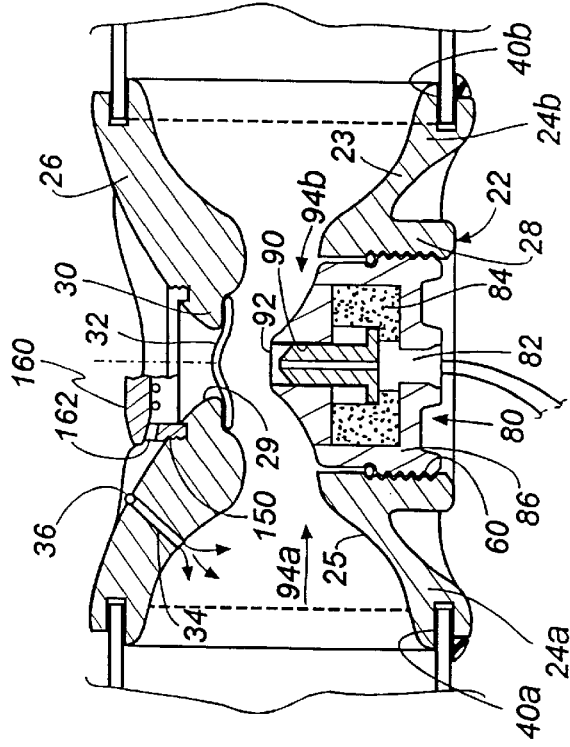
FIG. 5 is a partial cross-sectional view of another embodiment of the invention.

Reference is briefly made to FIG. 5 which illustrates an alternate embodiment of the invention. The center body 22 proximate the orifice 29 is provided with threads 150. A deflector cap 160 is secured to the body 22 such as by using complementary threads. The deflector cap 160 includes a plurality of orifices 162 therein to deflect the inflation gasses radially (see arrows 164) relative to the center body 22 as shown in FIG. 6.

Many changes and modifications in the above described embodiment of the invention can, of course, be carried out without departing from the scope thereof. Accordingly, that scope is intended to be limited only by the scope of the appended claims.

I claim:

1. A hybrid inflator (20) comprising:
   a pressure vessel (100) filled with pressurized inflation gas, comprising
      a center body (22) having a first (24a) and a second (24b) end, an exit orifice (29) located between the first and second end, a first frangible disk (32) closing the orifice (29) and first means (80) for causing the disk to rupture and permit inflation gas to exit the orifice;
      a first cylindrical portion (50) sealingly attached to the first end and a second cylindrical portion (50) sealing attached to the second end;
      wherein the body (22) includes a generant bore (60) generally below the exit orifice and wherein the inflator includes a generant housing (86) within the generant bore (60), and quantity of propellant (84) which when activated causes the first frangible disk to open permitting inflation gas to exit the inflator into an air bag (102).

2. The device as defined in claim 1 wherein the center body (30) includes fill means (34,36) for introducing an inert gas at a predetermined pressure level into the inflator.

3. The device as defined in claim 1 wherein the exit orifice (29) is located midway between the ends of the first and second ends.

4. The device as defined in claim 1 wherein the center body includes a through passage (25) including a converging nozzle (94a,b) between each end and the exit orifice, each converging nozzle including a throat portion (96a,b) below the exit orifice.

5. The device as defined in claim 4 further including gas flow diverting means (160) for diverting a generally unidirectional gas flow exiting the exit orifice into a multidirectional gas flow.

6. The device as defined in claim 5 wherein the multidirectional gas flow is generally perpendicular to the gas flow exiting the exit orifice.

7. The device as defined in claim 1 further including gas flow diverting means (160) for diverting the generally unidirectional gas flow exiting the exit orifice into a multidirectional gas flow.

8. The device as defined in claim 7 wherein the multidirectional gas flow is generally perpendicular to the gas flow exiting the exit orifice.

9. The device as defined in claim 1 including a slidable piston with a central passage of the generant housing.

10. The device as defined in claim 1 wherein the generant housing (86) includes an arcuately shaped external wall (85) forming a part of each nozzle throat portion.

11. The device as defined in claim 1 wherein a sliding piston 110 is located in the central passage (90) within the generant housing and movable into the first burst disk (92) upon activation of the propellant.

12. The device as defined in claim 11 wherein an end of the central passage (90) is sealed by a second burst disk.

13. The device as defined in claim 1 wherein the body, proximate each end (24a,b) includes a groove or slot and wherein an edge of each respective cylindrical member (50) is secured therein.

* * * * *